United States Patent [19]
Harden et al.

[11] Patent Number: 5,613,635
[45] Date of Patent: Mar. 25, 1997

[54] SELF-ALIGNING ROW CROP SPRAYING DEVICE

[76] Inventors: Jerrell W. Harden, Rte. #1, Box 226; Russell J. Harden, Rte. #1, Box 227B, both of Banks, Ala. 36005

[21] Appl. No.: 369,359

[22] Filed: Jan. 6, 1995

[51] Int. Cl.⁶ .............................. A01C 23/00; B05B 1/20
[52] U.S. Cl. .......................... 239/166; 239/169; 239/175; 47/1.7
[58] Field of Search .............................. 47/1.7; 239/159, 239/164, 166, 169, 172, 175

[56] References Cited

U.S. PATENT DOCUMENTS

| | | | |
|---|---|---|---|
| 3,202,359 | 8/1965 | Gill | 239/172 X |
| 3,223,330 | 12/1965 | La Plante | 239/168 |
| 3,515,349 | 6/1970 | Mecklin et al. | 239/169 |
| 3,683,547 | 8/1972 | Harden | 47/1.7 |
| 3,785,564 | 1/1974 | Balocchi | 239/172 |
| 5,312,043 | 5/1994 | Whitney | 239/754 |

*Primary Examiner*—Lesley D. Morris
*Attorney, Agent, or Firm*—Zarley, McKee, Thomte, Voorhees, & Sease

[57] ABSTRACT

A self-aligning row crop spraying device includes a parallelogram-shaped device comprised of a pair of guide support members disposed parallel to each other and a pair of transverse members also parallel to each other. One of the transverse members is fixed to a structure allowing the remainder of the parallelogram-shaped device to move freely about the transverse member. A pair of guide members form a channel for receiving plants. The device allows a spray nozzle to remain aligned with a row of crops throughout the spraying process.

11 Claims, 4 Drawing Sheets

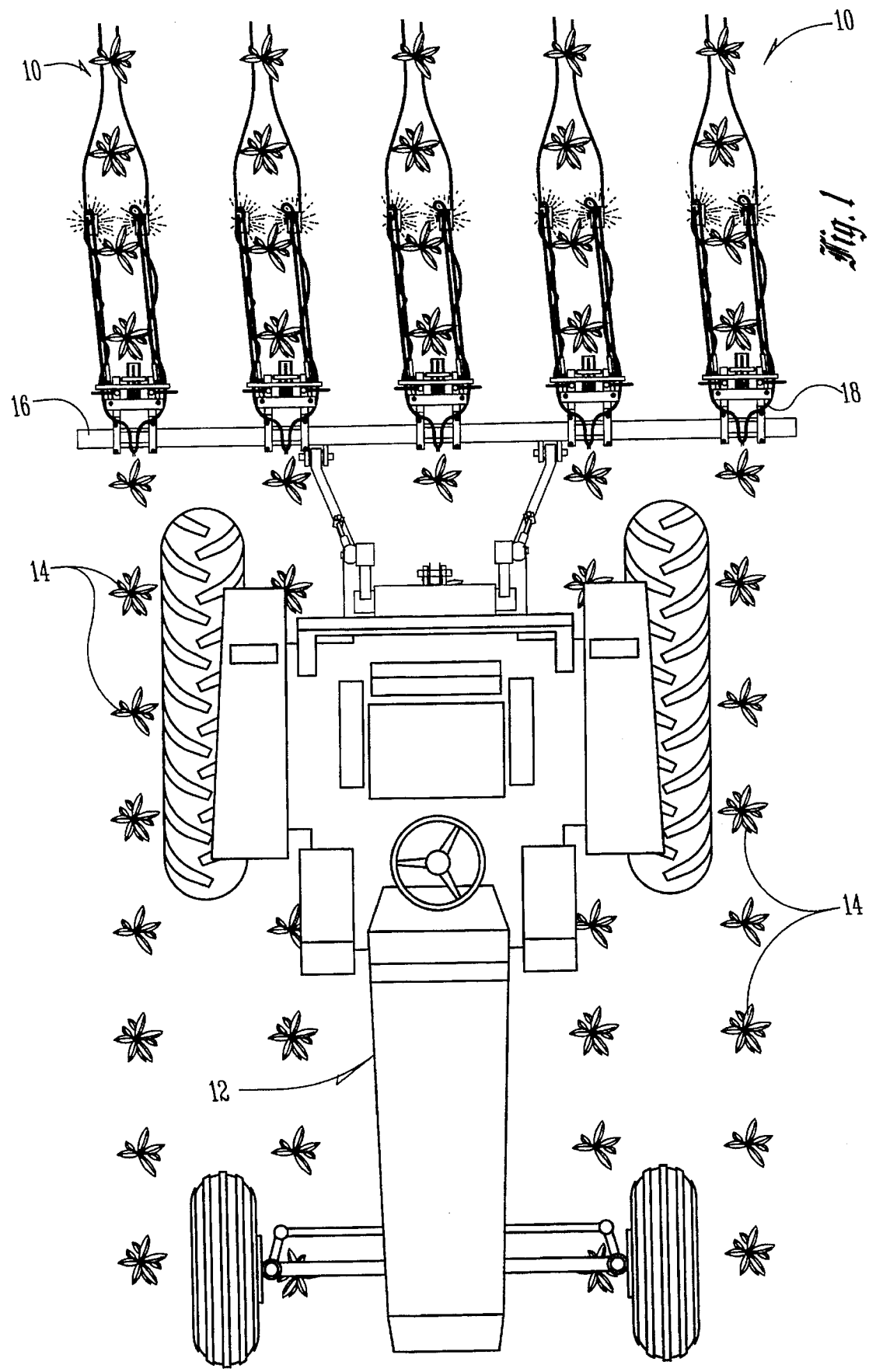

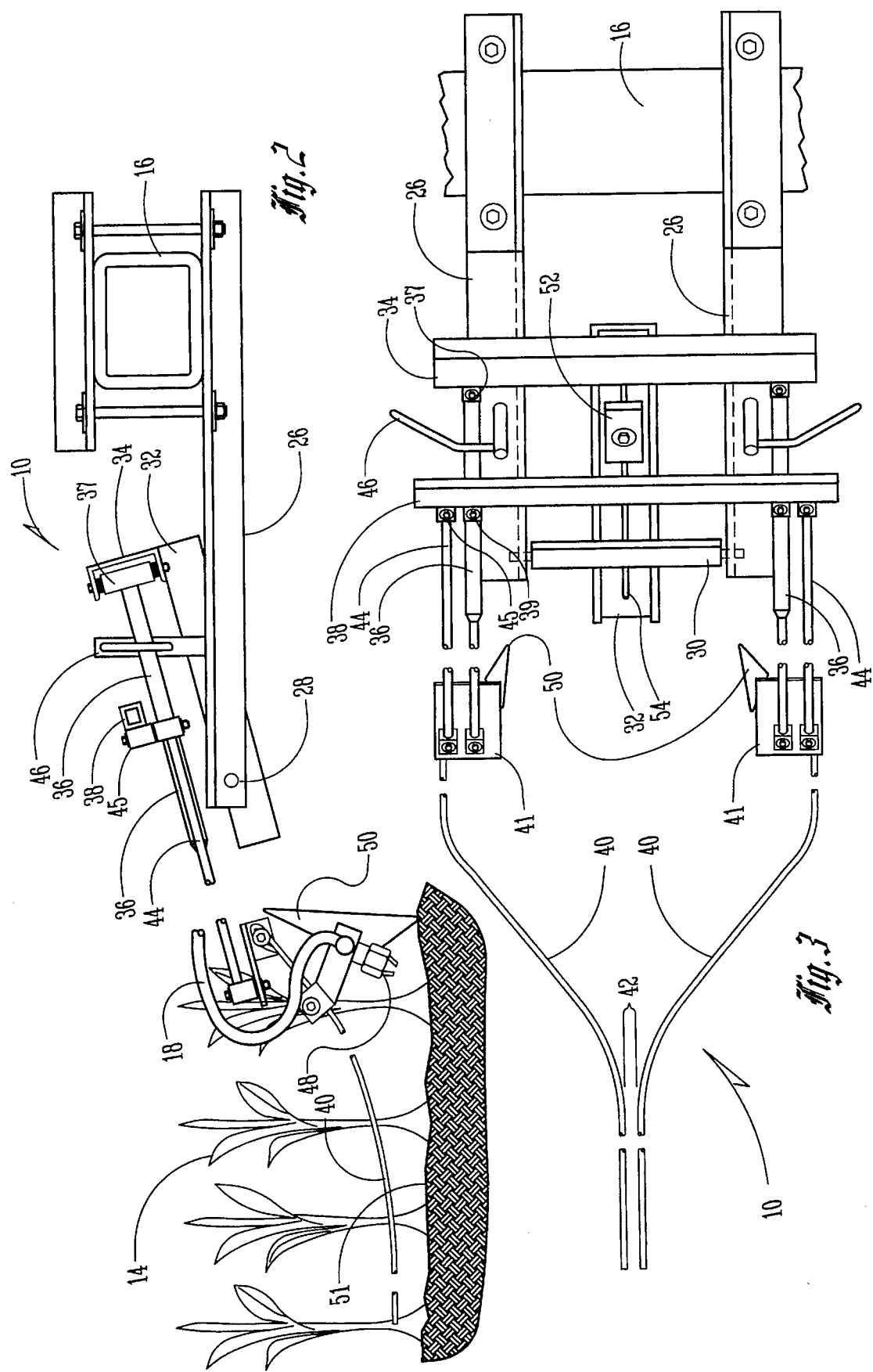

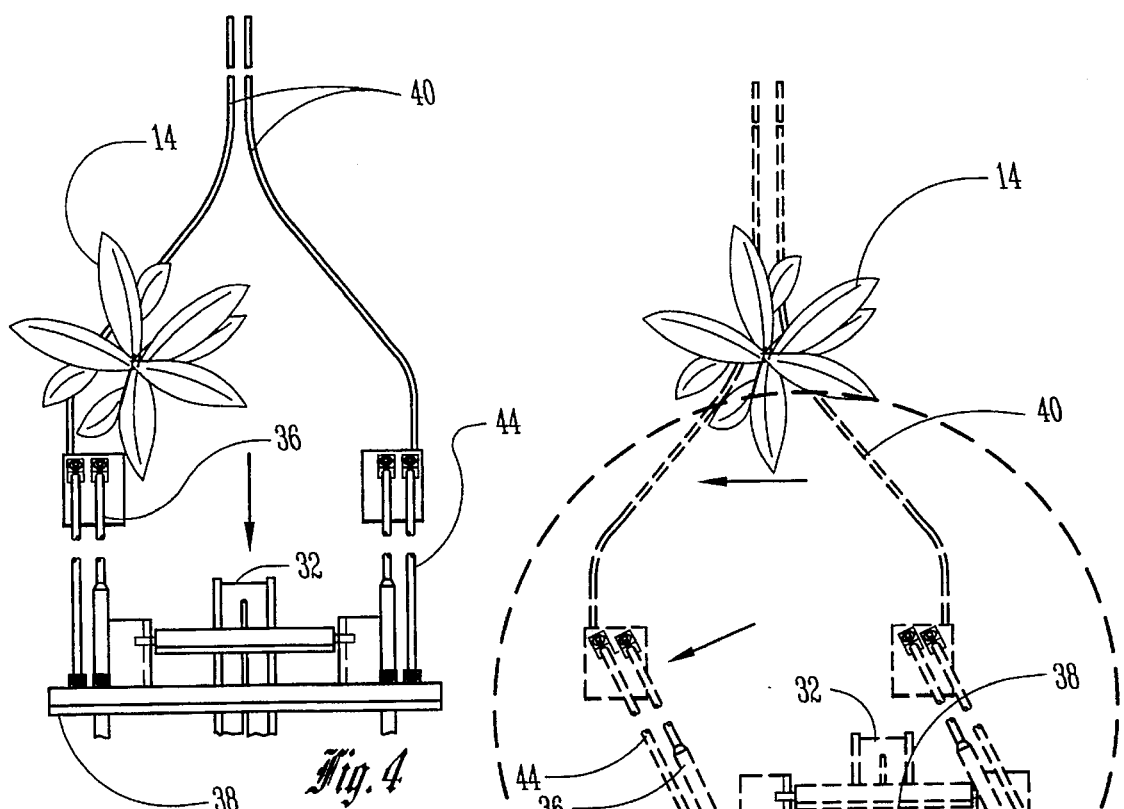
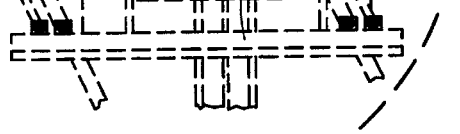
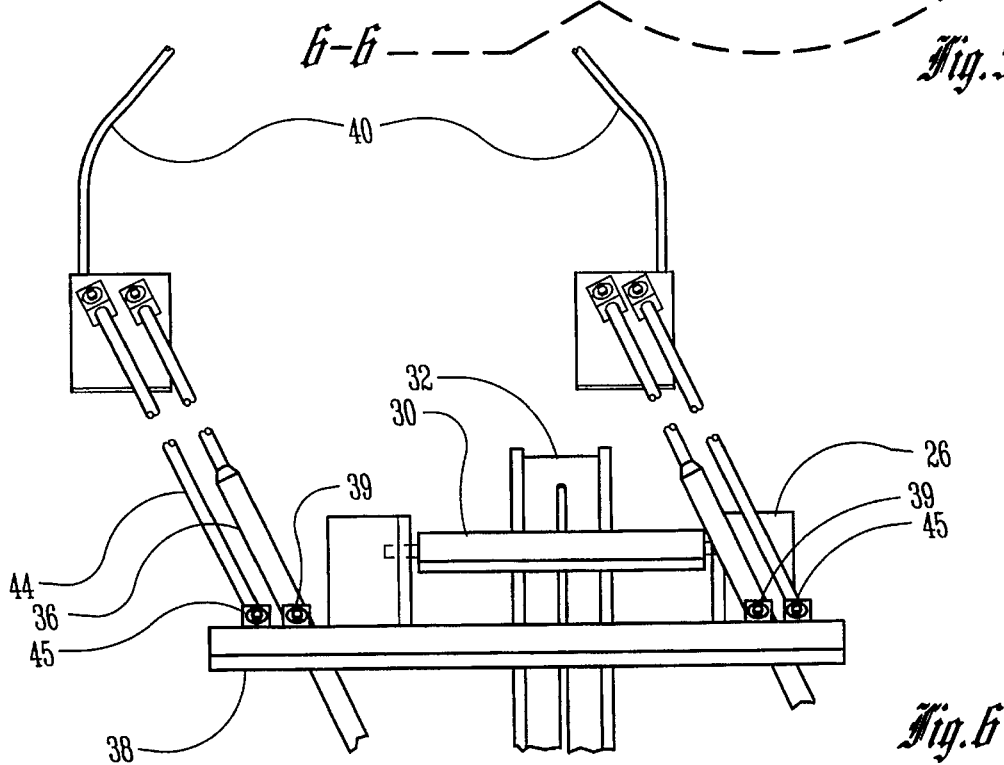

SELF-ALIGNING ROW CROP SPRAYING DEVICE

BACKGROUND OF THE INVENTION

1. Field of the Invention

The present invention relates to sprayers for use on row crops. More particularly, the present invention relates to self-aligning row crop spraying devices.

2. Problems in the Art

Spraying devices exist in the prior art, but contain undesired limitations. A typical prior art spraying device includes a boom assembly mounted on a mobile carrier. For each row of plants, the boom will include an arm assembly with a spray nozzle attached for directing a fluid spray toward a crop row. The nozzles will move with the boom regardless of where the plants are.

There is a need for efficient and accurate spraying devices that do not waste chemicals but at the same time sufficiently spray each plant. With the price of agricultural chemicals rising each year, along with increasing environmental concerns, it has become desired that the spray from spraying devices be accurately and precisely directed to the plants or the ground adjacent to the plants without overlapping spray patterns or without using excess chemicals, while at the same time sufficiently covering each plant. This problem is intensified by the fact that crops are typically planted with four or six row planters but are sprayed with devices which can handle perhaps 24 rows. If a crop has been planted with a four row planter, those first four rows will be in perfect alignment with each other. However, the next four rows may not be in precise alignment with the first four rows. As a result, spraying devices with fixed spray nozzles cannot be centered over each row. In addition, plants within a typical row can be misaligned or off-center by several inches. Also, when a spraying device is guided through a curve in the field, the spray nozzles may not precisely follow the row through the curve.

Some prior art attempts at solutions to this problem include using hand held sprayers. However, this has the huge disadvantages of being tedious, time consuming, requiring substantial physical labor, and their effectiveness and efficiency depends on the personal care of the operator. Other prior art solutions rely on multiple nozzle arrangements with a fixed orientation to ensure that the spray reaches each plant in rows in which misalignment of successive plants is unavoidable. This solution also is an undesirable solution because it still encounters the same problems described above.

FEATURES OF THE INVENTION

A primary feature of the present invention is the provision of a self-aligning row crop spraying device.

A further feature of the present invention is the provision of a self-aligning row crop spraying device utilizing a parallelogram device for aligning the spraying device with the crops.

A further feature of the present invention is the provision of a self-aligning row crop spraying device having a pair of guide members forming a channel to receive plants and align the spraying device.

A further feature of the present invention is the provision of a self-aligning row crop spraying device having a pivot point which allows each spraying device to pivot along a vertical plane.

A further feature of the present invention is the provision of a self-aligning row crop spraying device having at least one weight on the device to help balance the device in a desired position.

These as well as other features of the present invention will become apparent from the following specification and claims.

SUMMARY OF THE INVENTION

A self-aligning row crop spraying device of the present invention includes a pair of guide support members disposed generally parallel to each other, a transverse member pivotally coupled to both guide support members, and a cross bar member pivotally coupled to each guide support member. Together, these four members form a parallelogram-shaped device. The transverse member is ultimately coupled to a mobile carrier such as a tractor. The guide support members are free to move laterally relative to the transverse member. A pair of guide members are coupled to the guide support members and extend rearwardly in a trailing manner to form a channel for receiving plants. As the mobile carrier moves the device through a field, the guide members will come into contact with plants which in turn forces the parallelogram device to become aligned with the plants. At least one spray nozzle is coupled to the parallelogram device for spraying a chemical spray on the plants. Therefore, even if a row of plants is out of alignment with the other rows, the self aligning device will allow the spray nozzle to remain aligned with the crop row.

BRIEF DESCRIPTION OF THE DRAWINGS

FIG. 1 is a top view of a tractor attached to a spraying device utilizing the present invention.

FIG. 2 is a side view of a spraying device of the present invention.

FIG. 3 shows a top view of a spraying device of the present invention.

FIG. 4 shows a top view of a spraying device of the present invention as the spraying device encounters a plant.

FIG. 5 shows the device of FIG. 4 after being aligned with the plant.

FIG. 6 shows an enlarged view of FIG. 5.

DETAILED DESCRIPTION OF THE PREFERRED EMBODIMENT

Figure 7:
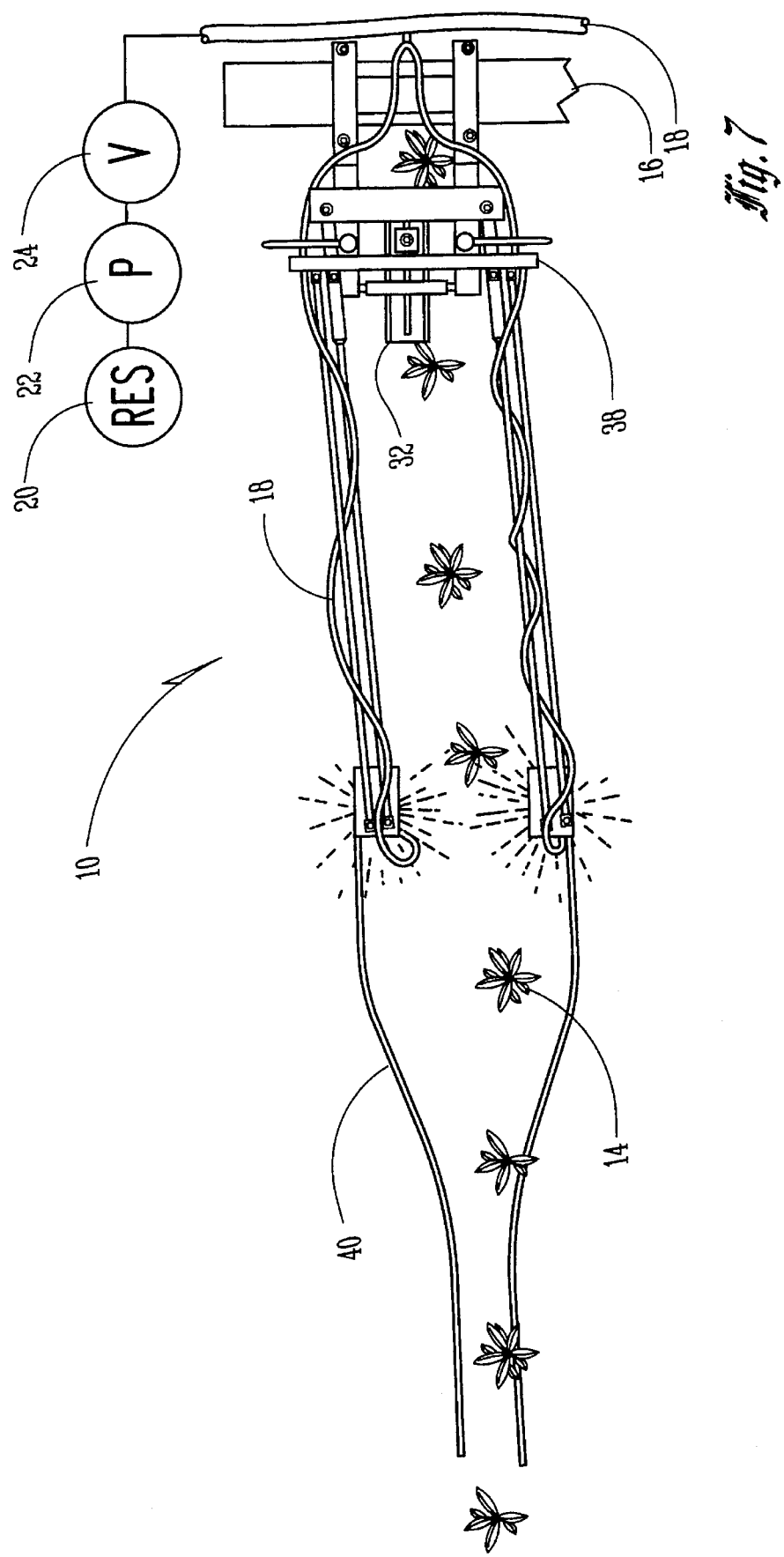
FIG. 7 shows a top view of a spraying device of the present invention as it is aligned with and is spraying a crop row.

The present invention will be described as it applies to its preferred embodiment. It is not intended that the present invention be limited to the described embodiment. It is intended that the invention cover all alternatives, modifications, and equivalences which may be included within the spirit and scope of the invention.

FIG. 1 shows a top view of a sprayer utilizing the self-aligning spraying device 10 of the present invention. The spraying device 10 is attached to a tractor 12 in a field of row crops 14. The sprayer in FIG. 1 includes a draw bar 16 which is attached to a tractor 12. The draw bar 16 can be attached to the tractor 12 in a number of ways such as by a three point hitch. The sprayer shown in FIG. 1 includes five self-aligning row crop spraying devices 10 spaced apart on the draw bar 16 to generally be aligned with the rows of crops 14. Note that a sprayer using the present invention could be equipped to handle any number of rows. FIG. 7 shows an enlarged view of one of the self-aligning spraying devices 10 shown in FIG. 1. The spraying device 10 is attached to the draw bar 16 and has a conduit 18 connected to a chemical reservoir 20, a sprayer pump 22, and a sprayer valve 24.

FIG. 2 shows a side view of the present invention. A pair of arms 26 are attached to the draw bar 16 and extend rearwardly from the draw bar 16. The arms 26 include apertures 28 (FIG. 2) for receiving the ends of bar 30 or the like for pivotally coupling the self-aligning spraying device 10 to the arms 26. FIG. 3 shows a top view of the device shown in FIG. 2. A forwardly extending channel member 32 is welded to bar 30 to pivot with bar 30 on arms 26 as described above. At the forward end of the channel member 32, a transverse member 34 is rigidly coupled perpendicularly to the channel 32. Near each end of the transverse member 34, a guide support member 36 is pivotally coupled by pivot 37 thereto (FIG. 2). The two guide support members 36 extend rearwardly from the transverse member 34 and are parallel to each other. Rearwardly from the point where the guide support members 36 attach to the transverse member 34 (i.e. pivots 37), a cross bar 38 is pivotally coupled by pivot 39 to the guide support members 36 (FIG. 3). The cross bar 38 is parallel to the transverse member 34.

As an alternative to the cross bar 38 shown in FIG. 3, the cross bar 38 could be coupled to guide support members 36 at any point, for example, at the rearwardly ends of guide support members 36. Also, cross bar 38 could be U-shaped to help allow taller plants to pass through the device.

Together, the cross bar 38, transverse member 34, and two guide support members 36 form a parallelogram-shaped device. The guide support members 36 can pivot together about pivots 37 on transverse member 34. Because the guide support members 36 are also pivotally attached to the cross bar 38 at pivots 39, the rearward ends of guide support members 36 remain the same distance from each other.

A coupling plate 41 is pivotally coupled to each guide support member 36 (FIG. 3). A guide member 40 is coupled to each of the guide support members 36 via coupling plate 41 as shown in FIGS. 2 and 3. Together, the two guide members 40 form a plant channel 42 for receiving plants 14 as the self-aligning spraying device 10 moves through a field. This is illustrated in FIGS. 1 and 7. The guide members 40 could be part of the guide support members 36 or could be separate pieces coupled to the parallelogram-shaped device. Preferably, each guide member 40 is coupled to a guide support member 36 via coupling plate 41, and extends rearwardly and downwardly from it as shown in FIGS. 2 and 3.

A second pair of guide support members 44 are pivotally attached to the cross bar 38 by pivots 45 adjacent to the pivots 39 of the first pair of guide support members 36 (FIGS. 3 and 6). The purpose of the second pair of guide support members 44 is to keep the guide members 40 in the same orientation with respect to each other as they move laterally. In other words, the guide members 40 will not turn, but rather will only mote laterally relative to the spraying device. In this way, the plant channel 42 will remain perpendicular to the drawbar 16.

As shown in FIG. 2, the spraying device 10 can pivot vertically within the axes of apertures 28. A stop bar 46 is attached to each arm 26 to limit how far the spraying device can pivot downward. Once the spraying device pivots downward a sufficient distance, the guide support members 36 will make contact with the stop bar 46, stopping the device from pivoting any farther. The preferred embodiment of the present invention also includes a weight 52 slidably coupled to the channel 32 for balancing the device 10 about the pivot point (FIG. 3). Weight 52 can be slidably moved back and forth along a slot 54 in channel 32 to fine tune the balance of the device. If additional weight is needed to balance the device, more weights can be added to transverse member 34.

As shown in FIG. 2, the spraying device 10 includes a pair of nozzles 48 attached to a point rear the coupling plate 41. However, the nozzles 48 could be attached to other places on the spraying device 10. The nozzles 48 are also attached to the conduit 18 for pumping a chemical spray from reservoir 20 through valve 24 to the nozzle 48 to spray the crops (FIG. 7). The spraying device 10 also includes a pair of shoe members 50 which are coupled to the nozzles 48 to keep the nozzles 48 off the ground 51 when the spraying device pivots downward (FIG. 2).

The preferred embodiment of the present invention operates as follows. A plurality of the devices 10 are attached to a draw bar 16 which is in turn attached to a tractor 12 or like as shown in FIG. 1. The spraying devices are moved through a field of row crops. As shown in FIG. 4, some of the plants 14 may not be perfectly aligned with each spraying device 10. When a plant 14 is not aligned such as in FIG. 4, the plant will come into contact with one of the guide members 40. As shown in FIG. 5, this makes the guide member 40 move to the left or right. When the guide member 40 moves, the entire parallelogram-shaped assembly moves along with it (FIG. 5). In this way, the spraying device remains aligned with the plant. Since the spray nozzles 48 are attached to the parallelogram-shaped device, the spray nozzles 48 will also remain aligned with the plants 14. Therefore, the chemical spray will always be sprayed on the plants in an efficient and consistent manner. FIG. 6 shows an enlarged view of FIG. 5 to more clearly show the position of the self-aligning spraying device 10 in a shifted aligned position.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit or scope of the invention as further defined in the following claims.

What is claimed is:

1. A self-aligning row crop spraying device comprising:

a transverse member attachable to a mobile carrier;

first and second guide support members disposed generally parallel to each other in a spaced relation, each of said guide support members having a forward and a rear end, each of said forward ends of said guide support members having a pivotal coupling with said transverse member;

a cross bar having a pivotal coupling unit each of said guide support members defining a parallelogram-shaped device consisting of said cross bar, said first and second guide support members, and said transverse member, wherein said pivotal couplings each have an axis which is perpendicular to a plane defined by the parallelogram-shaped device, and wherein said plane is generally parallel to a ground surface;

first and second guide members coupled to said rear ends of said first and second guide support members, respectively, said first and second guide members forming a channel; and a spray nozzle coupled to said parallelogram-shaped device, wherein said guide members make contact with a row crop biasing said spray nozzle and said parallelogram-shaped device toward said row crop.

2. The self-aligning row crop spraying device of claim 1 wherein said parallelogram-shaped device is vertically pivotal with respect to the ground surface.

3. The self-aligning row crop spraying device of claim 2 further comprising at least one weight mounted on said device to help balance said parallelogram-shaped device about a vertical pivot.

4. The self-aligning row crop spraying device of claim 3 wherein said weight is movably mounted to said spraying device such that the balance of said device can be adjusted by sliding said weight one way or the other.

5. The self-aligning row crop spraying device of claim 1 wherein said guide members further comprise a first portion extending downwardly from said guide support members, and a second portion extending rearwardly from said first portion generally parallel to the ground surface.

6. The self-aligning row crop spraying device of claim 1 further comprising third and fourth guide support members, each of said third and fourth guide support members having a forward end and a rear end, said third and fourth guide support members being disposed proximate to and generally parallel to said first and second guide support members, respectively, said forward ends of said third and fourth guide support members each being pivotally coupled to said cross bar, said rear ends of said third and fourth guide support members being pivotally coupled to said rear ends of said first and second guide support members, respectively, such that when said parallelogram-shaped device shifts laterally, said guide support members maintain the same position with respect to each other.

7. The self-aligning row crop spraying device of claim 1 further comprising a shoe member coupled to said spraying device near said spray nozzle wherein said shoe member prevents said spray nozzle from contacting the ground surface.

8. The self-aligning row crop spraying device of claim 1 wherein said parallel-shaped device defines a parallelogram on a generally horizontal plane.

9. The self-aligning row crop spraying device of claim 1 further comprising:
- a pair of parallel spaced support arms having forward and rearward ends with the forward ends adaptable for mounting to a transverse draw bar;
- a transverse cross arm pivotally secured to said rearward ends of said support arms;
- a third support arm having upper and lower ends, said lower end secured to said transverse cross arm, said upper end secured to said transverse member.

10. A self-aligning row crop spraying device comprising:
- first and second guide support members disposed generally parallel to each other in a spaced relationship;
- first and second transverse members disposed generally parallel to each other in a spaced relation, each of said transverse members having a pivotal coupling with both of said first and second guide support members forming a parallelogram-shaped device on a generally horizontal plane, wherein said pivotal couplings each have an axis which is perpendicular to a plane defined by the parallelogram-shaped device;
- first and second guide members, said first and second guide members coupled to said first and second guide support members, respectively, forming a channel for receiving a plant;
- at least one spray nozzle coupled to said spraying device wherein said guide members make contact with plants keeping said parallelogram-shaped device aligned with said plants such that said spray nozzle remains aligned with said plants.

11. A self-aligning row crop spraying device for a field of row crops comprising:
- a mobile carrier for moving through the field of row crops;
- a parallelogram-shaped device coupled to the mobile carrier, said parallelogram-shaped device being comprised of four elongated members rotatably coupled at respective ends of the elongated members such that movement of the elongated members causes the parallelogram-shaped device to change shapes while maintaining opposite parallel sides;
- first and second guide members coupled to the parallelogram-shaped device such that the first and second guide members can move laterally with respect to the direction of movement of the mobile carrier when the elongated members move, said first and second guide members trailing the parallelogram-shaped device as the mobile carrier moves through the field, said first and second guide members being disposed in a spaced relation forming a channel for receiving said row crops between the first and second guide members;
- at least one spray nozzle coupled to said spraying device; and
- wherein said guide members make contact with said row crops in said channel as the mobile carrier moves through the field keeping said nozzle aligned with said row crops.

* * * * *